United States Patent [19]

Beyer-Olsen

[11] Patent Number: 4,995,842
[45] Date of Patent: Feb. 26, 1991

[54] BUOY WITH REDUCED DRAG

[76] Inventor: Knut Beyer-Olsen, 17 Cascade Key, Bellevue, Wash. 98006

[21] Appl. No.: 280,888

[22] Filed: Dec. 7, 1988

[51] Int. Cl.$^5$ .................................................. B63B 22/18
[52] U.S. Cl. ........................................... 441/22; 441/6
[58] Field of Search .......................... 441/22, 1, 6, 23; 114/219, 243, 242; 43/100, 102, 103, 104

[56] References Cited

U.S. PATENT DOCUMENTS

| | | | |
|---|---|---|---|
| 612,109 | 10/1898 | Hutchins | 441/22 |
| 846,567 | 3/1907 | Hill | 441/22 |
| 2,680,859 | 6/1954 | Hultberg | 114/219 |
| 3,329,119 | 7/1967 | Fritzsche | 114/121 |
| 3,500,209 | 3/1970 | Fletcher et al. | 441/22 |
| 4,262,379 | 4/1981 | Jankiewicz | 43/100 |

Primary Examiner—Sherman Basinger
Assistant Examiner—Thomas J. Brahan
Attorney, Agent, or Firm—Seed and Berry

[57] ABSTRACT

An elongated buoy with protruding external ribs extending about the circumference of the buoy. The ribs are oriented substantially perpendicular to the longitudinal axis of the buoy and create turbulence when the buoy is dragged upon the surface of the water. The turbulence results in decreased drag and permits easier and faster retrieval of the buoy by a crew member hauling in by hand a line attached thereto.

10 Claims, 1 Drawing Sheet

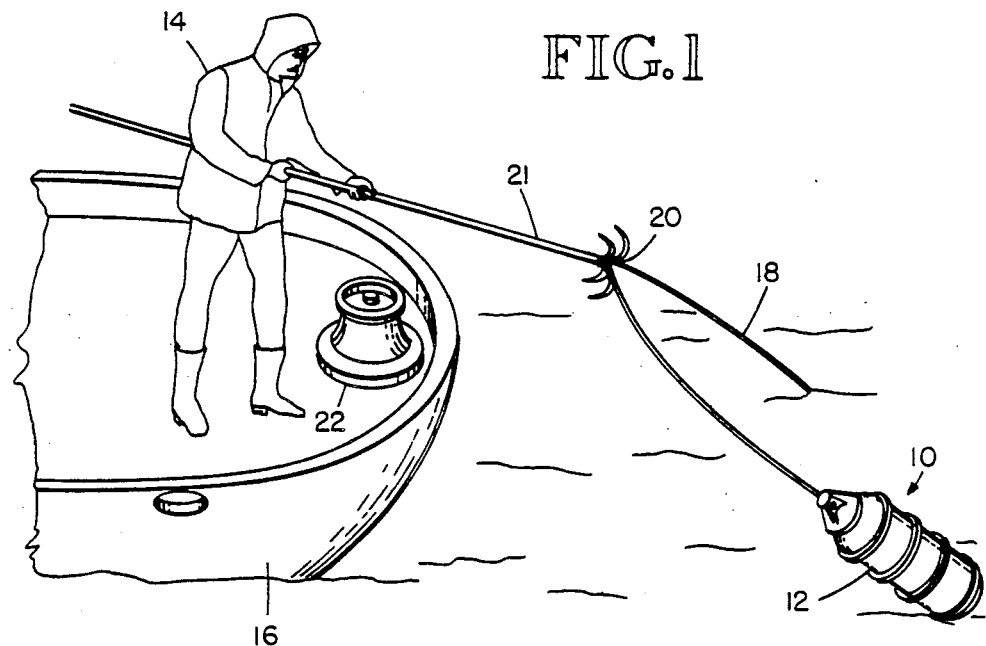
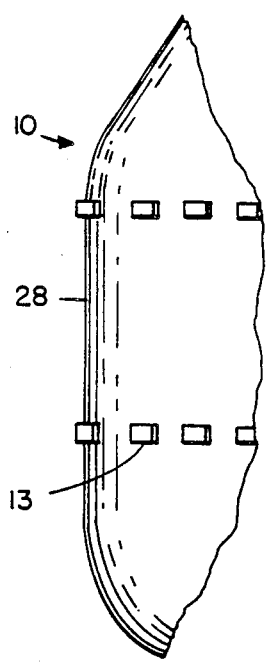
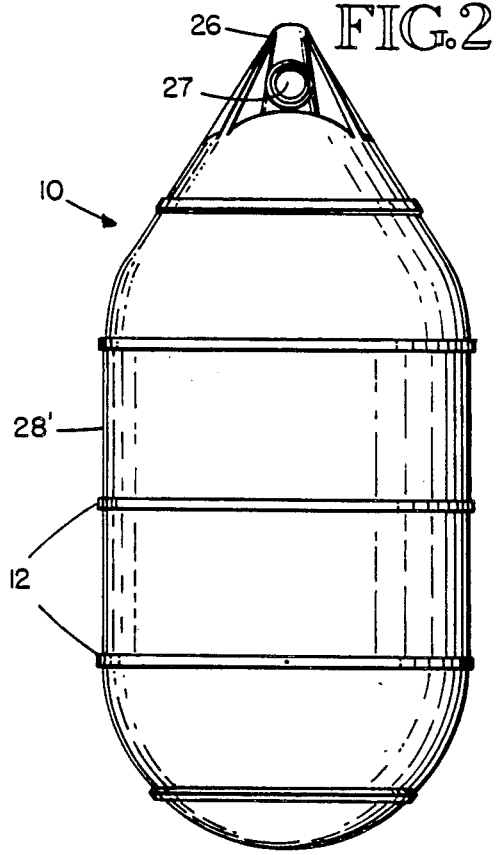

BUOY WITH REDUCED DRAG

TECHNICAL FIELD

The present invention relates to a buoy, and more particularly to a buoy with reduced drag.

BACKGROUND OF THE INVENTION

Buoys are used on vessels for a variety of purposes, such as to mark the location of a submerged object by connecting the buoy to the submerged object via a line.

In the crabbing industry, a buoy is connected to one end of a length of line with the other end of that line connected to a crab pot. The crab pot is placed in the water and, due to its weight, comes to rest upon the ocean floor. The buoy floats upon the ocean surface and allows the subsequent recovery of the crab pot by providing a convenient marker for the line connected to the submerged crab pot. Sometimes two floating buoys are used as markers, with a length of line interconnecting them.

During recovery of the crab pot, the fishing vessel motors past the floating buoy and a member of the crew, using a hand rope with a grappling hook, retrieves the line attached to the buoy without the vessel stopping. The crew member must throw the grappling hook, hook the buoy line with the grappling hook, pull the hand rope in, grap the hooked buoy line with his hands, wrap the buoy line around a winch on the vessel's deck and then start operating the winch, all while the vessel is moving and before the slack in the buoy line is lost and the full weight of the crab pot is borne by the buoy line. The crab pot, which can weigh as much as 600 pounds, is then winched to the surface and the crabs therein recovered.

During manual retrieval of the line attached to the floating buoy, the buoy is usually pulled upon the surface of the water producing a drag upon the retrieved line and requiring a greater exertion by the crew member prior to placing the line around the winch. Not only does this wear the crew member out, it slows him down and lengthens the time required to manually retrieve the line and wrap it around the winch. As such, the drag created by the buoy thus increases the likelihood that the crew member will not be able to successfully wrap the line around the winch before all line slack is lost and the crew member finds himself handling the full weight of the loaded crab pot. In such a situation, he will be pulled overboard if he does not let go of the line. Of course, this means the vessel must turn around and make another pass by the buoy so it can be hooked again and successfully retrieved. Since the drag requires greater exertion by the crew member to retrieve the line and slows him down, the vessel must reduce its speed through the water during retrieval of the line to accommodate the crew member.

Therefore, there is need in the art for an improved buoy with reduced drag. The present invention provides such a buoy, while further providing other advantages.

SUMMARY OF THE INVENTION

An object of the present invention is to provide a buoy with reduced drag. Another object is to disturb the surface flow of water around a buoy being dragged on the surface of the water to produce reduced drag.

In one embodiment of the present invention, a plurality of external circumferential ribs are fixed to the body of a flotational buoy. There is located is the buoy an opening to allow a line to be attached to the body of the buoy. The circumferential ribs are placed upon the buoy such that they are substantially perpendicular to the direction of travel of the buoy when the buoy is being dragged upon the surface of the water.

BRIEF DESCRIPTION OF THE DRAWINGS

FIG. 1 is a perspective view of a crew member retrieving a line attached to a buoy embodying the present invention.

FIG. 2 is a enlarged side elevational view of the buoy shown in FIG. 1.

FIG. 3 is a fragmentary side elevational view of an alternate embodiment of a buoy of the present invention.

DETAILED DESCRIPTION OF THE INVENTION

A buoy being dragged upon the surface of the water will produce a pull upon the retrieving line. In other words, the buoy will produce a drag which must be overcome by the crew member in order to retrieve the line attached thereto. Moreover, if the vessel is moving, this drag will be increased.

The drag associated with a particular buoy will vary depending upon the size and shape of the buoy. For example, round buoys utilized in the crabbing industry may typically produce 24 pounds drag or pull, whereas an oblong buoy may produce 8 to 12 pounds pull.

As shown in the drawings for purposes of illustration, the present invention resides in a buoy 10 having a plurality of circumferential ribs 12 upon the buoy. The ribs are oriented substantially perpendicular to the longitudinal axis of the buoy which corresponds to the direction of the buoy's travel when pulled. With the buoy 10 of the present invention, the drag or pull of the buoy drops from 8 to 12 pounds to as low as 2 to 3 pounds pull.

The circumferential ribs 12 of the present invention serve to break the flow of water around the buoy 10 and thereby create surface turbulence. This turbulence is believed to result in alleviating the suction which develops between the buoy and the surface of the water, and reduces the buoy's drag.

In the crabbing industry, it is advantageous for a crab boat not to have to slow down or stop each time a crab pot is retrieved. Therefore, a crew member 14 on a crab boat 16, such as shown in FIG. 1, will retrieve a buoy line 18 attached to the buoy 10 by throwing a grappling hook 20 attached to the hand rope 21, pull the hooked buoy line in by hand using the hand rope, and then hurriedly wrap the retrieved buoy line around a winch 22 before slack in the buoy line is removed due to the boat's movement. The crew member would then proceed to winch the crab pot (not shown) to the surface. Prior to placing the retrieved line 18 around the winch 22, buoy 10 will be dragged upon the surface of the water making the crew member's task more strenuous. By providing the buoy with less drag, the crab boat may maintain a higher speed during the retrieval process by alleviating a substantial amount of the drag that would otherwise be produced by the buoy without the ribs 12 of the present invention.

In other situations it may be necessary to haul in lines with buoys attached completely by hand. By decreasing the drag of such buoys, a fisherman faced with such a task may now decrease the amount of force required to retrieve a line. In inclement weather conditions, a buoy with less drag is particularly advantageous in that it allows the fisherman to complete the task of retrieval quickly.

Referring to FIG. 2, a preferred embodiment of the buoy 10 of the present invention is depicted. Buoy 10 has an end 26 which contains an opening 27 to permit a line 18 (not shown in FIG. 2) to be attached to the buoy. Circumferential ribs 12 fully encircle buoy 10 and result in the disruption of the flow of water around the buoy when the buoy is dragged on the surface of the water.

In order for the ribs 12 to break the suction created between the buoy 10 and the surface of the water, it is necessary that the ribs be aligned substantially perpendicular to the direction of the buoy's travel through the water and project outward beyond a smooth body portion 28 of the buoy. For example, longitudinal ribs do not serve to create the necessary turbulence and, therefore, do not yield a buoy with decreased drag.

Preferably, the circumferential ribs protrude from the body an amount sufficient to reduce the buoy's drag, but do not protrude to an extent whereby the ribs cause, rather than alleviate, drag. For example, buoy 10 depicted in FIG. 2 may typically be about 62 cm in length, 30 cm in width, and with ribs 12 protruding from the smooth body surface 28 approximately 0.3 cm–0.4 cm. Preferably, the circumferential ribs 12 have relatively squared edges to provide a sharp edge and thereby increase the turbulence produced.

While FIG. 2 depicts five circumferential ribs 12 upon the buoy 10, any number of such ribs may be utilized provided they create the necessary turbulence to result in the decreased drag desired. Moreover, while FIG. 2 depicts the circumferential ribs aligned perpendicularly to the longitudinal axis of the buoy and its direction of travel upon the water, the ribs need only be oriented such that the necessary turbulence is created. Thus, they may be aligned at an angle other than 90 degrees to the direction of the buoy's travel upon the water.

Referring to FIG. 3, an alternative embodiment of the present invention is depicted. Buoy 10 has arranged upon the smooth body portion 28 a linear arrangement of spaced rectangular extrusions 13. This series of protrusions similarly serve to create turbulance and thereby reduce the buoy's drag upon the surface of the water.

Although the present invention has been described in conjunction with preferred embodiments, it is to be understood that modifications and variations may be resorted to by those skilled in the art without departing from the spirit and scope of the invention. Such modifications and variations are considered to be within the purview and scope of the invention and the applied claims.

I claim:

1. A method for reducing surface drag on a buoy attached to a line and deployed in a body of water when retrieving the buoy from a vessel moving through the water, comprising:
   providing a buoy with a body having a substantially smooth, circumferential exterior sidewall surface and first and second ends, the first end having an opening therein sized for attachment of the line, the body having a coefficient of drag when pulled upon the surface of the body of water by the line attached to the first body end;
   providing the buoy with at least one circumferential rib positioned between the first and second body ends and extending around the body, the rib projecting outward a uniform distance beyond the exterior body sidewall surface an amount sufficient to reduce the coefficient of drag of the body when pulled upon the surface of the body of water by the line attached to the first body end; and
   grasping the line attached to the buoy and pulling on the line while the vessel is moving to pull the buoy to the surface of the body of water and toward the vessel, whereby the rib reduces the drag on the buoy and hence the force required to pull the buoy upon the surface of the body of water.

2. The method of claim 1 wherein the body is provided with an elongated body.

3. The method of claim 1 wherein the circumferential rib provided extends around the body substantially perpendicular to an axis extending between the first and second body ends so as to extend in a direction perpendicular to the travel of the body when pulled upon the surface of the body of water by the line attached to the first body end.

4. A method for ruducing surface drag on a buoy attached to a line and deployed in a body of water when retrieving the buoy from a vessel moving through the water, comprising:
   providing a buoy with a body having a circumferential exterior side wall surface and means for attachment of the line, the body having a coefficient of drag when pulled upon the surface of the body of water by the line attached to the attachment means;
   providing the buoy with at least one rib projecting outward a uniform distance beyond the exterior sidewall surface of the body an amount sufficient to reduce the coefficient of drag of the body when pulled upon the surface of the body of water by the line attached to the attachment means, and circumferentially extending at least partially around the body with an orientation extending across a direction of travel of the body defined by dragging the body upon the surface of the body of water by the line attached to the attachment means; and
   grasping the line attached to the buoy and pulling on the line while the vessel is moving to pull the buoy to the surface of the body of water and toward the vessel, whereby the rib reduces the drag on the buoy and hence the force required to pull the buoy upon the surface of the body of water.

5. The method of claim 4 wherein the body is provided with an elongated body, and the attachment means is located at one end of the elongated body.

6. The method of claim 4 wherein the circumferential rib extends around the body substantially perpendicular to the direction of travel of the body upon the surface of the water.

7. A buoy attachable to a line for use upon the surface of a body of water, comprising:
   an elongated flotational body having an end located upon a longitudinal axis thereof, the end having a hole sized to receive the line therethrough and fixably attach the line to the body, the body having a coefficient of drag when pulled upon the surface of the body of water by the line fixably attached to the body; and
   a plurality of outwardly projecting circumferential ribs oriented substantially perpendicular to the longitudinal axis, each rib circumferentially extending substantially continuously about the body and projecting outward an amount sufficient to reduce the coefficient of drag of the body when pulled upon the surface of the body of water by the line fixably attached to the body.

8. The buoy of claim 7 wherein the number of circumferential ribs is five.

9. The buoy of claim 7 wherein the circumferential ribs have substantially square edges.

10. A buoy attachable to a line for use upon the surface of a body of water, comprising:

an elongated flotational body having an end located upon a longitudinal axis thereof, the end having a hole sized to receive the line therethrough and fixably attach the line to the body, the body having a coefficient of drag when pulled upon the surface of the body of water by the line fixably attached to the body; and at least one outwardly projecting circumferential rib oriented substantially perpendicular to the longitudinal axis, the rib circumferentially extending substantially continuously about the body and projecting outward an amount sufficient to ruduce the coefficient of drag of the body when pulled upon the surface of the body of water by the line fixably attached to the body.

* * * * *